United States Patent
Gormley et al.

(10) Patent No.: US 8,455,032 B2
(45) Date of Patent: Jun. 4, 2013

(54) CARBONATING DEVICE, METHOD OF USE, AND RELATED DISCHARGE AND CAP ASSEMBLIES

(75) Inventors: David Michael Gormley, Bournemouth (GB); Marcus Durant, Honiton (GB)

(73) Assignee: Ingazzi Limited (GB)

( * ) Notice: Subject to any disclaimer, the term of this patent is extended or adjusted under 35 U.S.C. 154(b) by 0 days.

(21) Appl. No.: 13/577,543

(22) PCT Filed: Feb. 11, 2011

(86) PCT No.: PCT/GB2011/050261
§ 371 (c)(1),
(2), (4) Date: Sep. 27, 2012

(87) PCT Pub. No.: WO2011/098827
PCT Pub. Date: Aug. 18, 2011

(65) Prior Publication Data
US 2013/0017304 A1   Jan. 17, 2013

(30) Foreign Application Priority Data

Feb. 11, 2010   (GB) .................................. 1002305.9

(51) Int. Cl.
*A23L 2/54* (2006.01)
(52) U.S. Cl.
USPC .............................. 426/477; 261/61; 222/394
(58) Field of Classification Search
USPC .............................. 426/477; 261/61; 222/394
See application file for complete search history.

(56) References Cited

U.S. PATENT DOCUMENTS

| | | | |
|---|---|---|---|
| 5,329,975 A | 7/1994 | Heitel | |
| 7,028,864 B2* | 4/2006 | McCann et al. | 222/144.5 |
| 7,299,802 B2* | 11/2007 | Feldman | 128/204.18 |
| 7,730,912 B2* | 6/2010 | Blichmann | 141/264 |
| 2005/0092947 A1* | 5/2005 | Fleming | 251/129.2 |

FOREIGN PATENT DOCUMENTS

| | | |
|---|---|---|
| DE | 102 44 573 A1 | 4/2004 |
| GB | 2 141 632 A | 1/1985 |
| GB | 2 190 007 A | 11/1987 |
| GB | 2 200 571 A | 8/1988 |
| WO | 2008/075225 A1 | 6/2008 |

OTHER PUBLICATIONS

International Search Report from the European Patent Office dated Jun. 20, 2011 for PCT/GB2011/050261.

* cited by examiner

*Primary Examiner* — Anthony Weier
(74) *Attorney, Agent, or Firm* — Shumaker, Loop & Kendrick, LLP

(57) ABSTRACT

A carbonating device for carbonating an opened vessel including an inlet valve for receiving pressurized gas, an exit valve for expelling gas into a vessel to be carbonated, a trigger for opening the inlet valve, a trigger pressure regulator arranged to close the inlet valve, a discharge assembly, and a cap assembly, the discharge assembly coupled to and decoupled from the cap and including a port for discharging gas to the cap, the discharge port being opened and closed by a valve and a pressure regulator arranged to automatically close the discharge valve in response to a pressure level.

14 Claims, 6 Drawing Sheets

CARBONATING DEVICE, METHOD OF USE, AND RELATED DISCHARGE AND CAP ASSEMBLIES

CROSS-REFERENCE TO RELATED APPLICATIONS

This application claims priority to PCT/GB2011/050261 filed Feb. 11, 2011, which claims priority to GB1002305.9 filed Feb. 11, 2010, the entirety of both of which are incorporated by reference herein.

TECHNICAL FIELD AND BACKGROUND OF THE INVENTION

This invention relates to a carbonating apparatus for re-carbonating beverage vessels, and in particular, although not exclusively to re-carbonating opened fizzy drink containers in order to restore or maintain the drink that remains therein. The invention also relates to a method of using a carbonating apparatus in order to restore or maintain remains of a beverage from within an opened beverage vessel.

Re-carbonating apparatus are known. Such re-carbonators are particularly useful for keeping a carbonated drink fresh once a conventional carbonated drinks bottle has been opened. Carbonated drinks are known to loose freshness once a part of the contents of the beverage has been consumed, because the remaining liquid begins to lose its $CO_2$ content. As more of the drink is consumed, more $CO_2$ is lost. Generally the loss of $CO_2$ is most significant after half to two thirds of the contents has gone. The remaining amount of beverage is then still substantial, but not good to drink. The amount of $CO_2$ remaining in the beverage is also dependent on the length of time the bottle is stood without its headspace pressurized by carbon dioxide.

A particularly useful re-carbonator is disclosed in EP 211 4175. Here a re-carbonating apparatus comprises a re-carbonating device and a pressurised source of $CO_2$. The re-carbonating device comprises a cap that is provided to replace an as-supplied closure of an opened beverage vessel. The cap is adapted to close and seal the beverage vessel and also provides means to supply $CO_2$ to the sealed vessel. Here the cap is adapted to couple to a standard bicycle tyre inflator as the source of pressurised $CO_2$ to the re-carbonating device. The re-carbonating device includes a pressure release valve that is set at a predetermined value in order to vent the re-carbonating device to atmosphere once pressure within the beverage vessel reaches the level required to either keep the drink fresh circa 2 bar or to recarbonate the drink circa 8 bar. Thus the pressure release valve acts as a safety device to stop the vessel from being over pressurised. Consequently, there is provided a method of delivering $CO_2$ into the vessel using a known inflator.

Whilst known re-carbonating devices are able to adequately re-carbonate a beverage vessel, it would be advantageous to supply a pressurised source that is not able to accidentally discharge, for instance, during storage. Also, it is desirable to prevent the $CO_2$ from being dispensed needlessly in order to prevent wastage. Furthermore, venting the CO2 to the atmosphere when a predetermined pressure is reached within the beverage vessel is undesirable. This is because, due to the physical properties of $CO_2$, the pressure at the discharge point of a punctured $CO_2$ cartridge is in excess of 60 bar. Thus $CO_2$ is expelled from the cartridge at high flow rates. If a large amount of $CO_2$ is released from the cartridge in one go, the discharge of $CO_2$ can lead to excessive cooling of the cartridge. Thus there is a danger of freezer burn when coming into contact with the cartridge. Furthermore, if skin comes into direct contact with the $CO_2$, there is a danger of burning. Moreover, if the high flow rate is maintained, there is a danger that the valve controlling exit of $CO_2$ from the canister may be compromised by icing at the point of discharge. The high flow rate of the expelled $CO_2$ gas is also hard to control. This leads to the gas being vented straight out of the pressure release valve, which leads to excessive wastage of the $CO_2$. This is not cost effective. Furthermore, known over pressure valves that vent to the atmosphere do not particularly reduce the flow rate from the canister, thus there is a possibility of the discharge from the over pressure valve being directed by the incompetent person into the eyes or face of themselves or another. Also there is a danger that the discharge from an over pressure valve could come into contact with the user or bystander.

BRIEF SUMMARY OF THE INVENTION

It is an object of the present invention to attempt to overcome at least one of the above or other disadvantages. It is a further aim to provide a carbonating apparatus that prevents the user or other from coming into contact with the high pressure and flow rate of the gas exiting the canister. It is a further aim to provide a carbonating apparatus that prevents excessive wastage of the gas. It is a further aim to provide a carbonating apparatus that controls and reduces the flow rate from the $CO_2$ canister.

According to the present invention there is provided a carbonating assembly, carbonating device, discharge assembly, cap assembly and method of carbonating as set forth in the appended claims. Other features of the invention will be apparent from the dependent claims, and the description which follows.

According to a first aspect there is provided a carbonating device. The carbonating device has an inlet for receiving pressurised gas from a gas source. An inlet valve opens and closes the inlet. The inlet valve is operable by a trigger mechanism. When the valve is open gas can egress through the inlet. The carbonating device includes an exit. Gas within the carbonating device is expelled from the exit in order to carbonate a vessel. An exit valve opens and closes the exit. The carbonating device is improved because rather than venting excess gas to the atmosphere, the carbonating device includes means to automatically prevent excess release of gas. This is because a trigger pressure regulator is arranged to control the inlet valve so that it automatically closes the inlet when a predetermined pressure is reached within the carbonating device. Also, a carbonating pressure regulator is arranged to control the exit valve so that it automatically closes the exit valve when a predetermined pressure within the carbonating device is exceeded. The trigger pressure regulator trips at a pressure that is less than the pressure of the input gas. The carbonating pressure regulator trips at a pressure that is less than that of the trigger pressure regulator.

Advantageously the carbonating device may be formed from two separate assemblies. Thus according to a second aspect a discharge assembly is provided, and according to a third aspect a cap assembly is provided. The discharge assembly and cap assembly are able to be coupled and decoupled to provide a carbonating assembly. This is advantageous as it allows one discharge assembly to cooperate, in turn, with multiple cap assemblies in order to carbonate multiple vessels. Here the discharge assembly includes an outlet port. The outlet port is opened and closed by a discharge valve. A discharge pressure regulator is arranged to control the discharge valve in order to automatically close the discharge valve when a predetermined pressure value within the discharge assembly is exceeded. The predetermined pressure value is between the two pressure values of the trigger pressure regulator and carbonating pressure regulator. This is advantageous because, when separated, the mid pressure regulator prevents an accidental discharge.

Alternatively, when formed from a single device, it is advantageous if the exit value comprises a carbonating piston that is specifically adapted so that gas pressure within the carbonating assembly urges the carbonating piston to move initially in a first direction to an open position. When pressure within the carbonating assembly extends the predetermined value, the carbonating piston moves further in the first direction to a closed position. Hence, the carbonating pressure regulator controls the movement of the piston.

According to a further aspect there is provided a method of carbonating a vessel comprising using a carbonating assembly, cap assembly or discharge assembly of previous aspects.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE INVENTION

Figure 1:
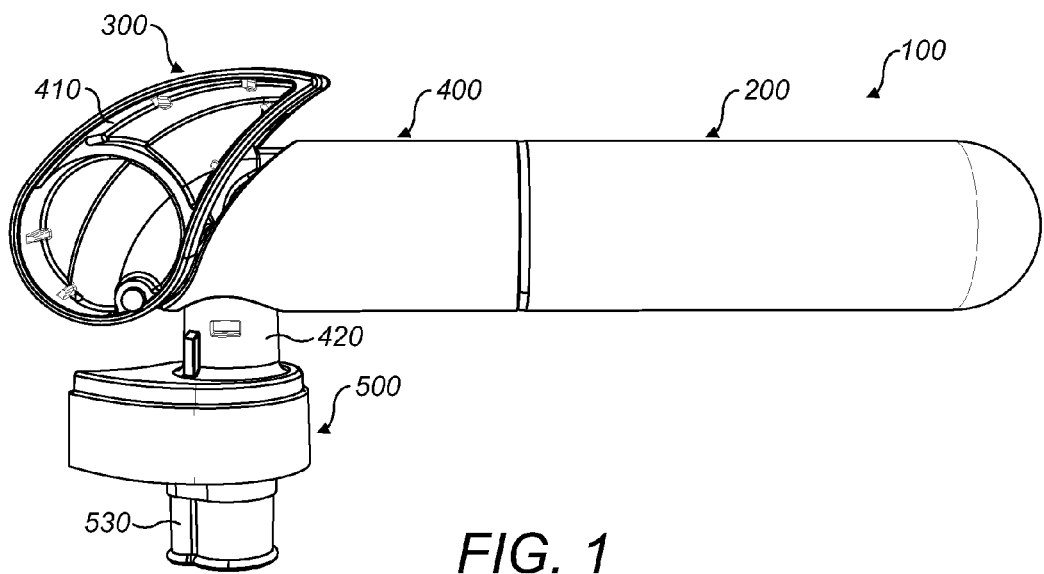
FIG. 1 is a pictorial view of a carbonating apparatus comprising a compressed gas cartridge connected to a carbonating device wherein the carbonating device comprises a discharge assembly connected to a cap assembly.

FIG. 1 shows a carbonating apparatus 100 comprising a compressed gas source 200 and a carbonating device 300. The carbonating device 300 is formed from two parts; a discharge assembly 400 and a cap assembly 500.

The compressed gas source 200 connects to the discharge assembly 400. Here the discharge assembly includes an inlet 402 that is opened and closed by a valve 404. The valve 404 is biased to be closed. When opened, gas is released from the gas source 200 into the discharge assembly 400.

The discharge assembly 400 includes a trigger 410. Activation of the trigger 410 cause the valve 404 to open and therefore releases gas from the compressed gas source 200 into the discharge assembly 400. The discharge assembly 400 includes a discharge port 420 that discharges gas from within the discharge assembly 400. A valve 430 is arranged to open and close the discharge port 420. The valve 430 is biased to close the discharge port 420.

The cap includes a sealing portion 510, an entrance port 520 and an exit port 530. In use the sealing portion 510 seals to a vessel to be carbonated (not shown). The entrance port 520 is in communication with an outside of the vessel and receives gas from the discharge port 420 of the discharge assembly 400. The exit port 530 is in communication with an inside of the vessel. A valve 540 is arranged to open and close the exit port 530. The valve 540 is biased to close the exit port 530.

In use the discharge assembly is coupled to the cap assembly to form the carbonating device 300. The valve 430 is arranged to automatically open the discharge port 420 when the discharge assembly 400 and cap assembly 500 are coupled. When the valve 430 is open the discharge port 420 and entrance port 520 are in fluid communication. Thus gas from the gas source 200 is discharged into the cap assembly 500. The pressure of the discharged gas within the cap assembly causes the valve 540 to open the exit port 530. Thus the vessel is carbonated by the release of the gas into the vessel.

In order to prevent over pressurising the vessel, cap assembly, and carbonating assembly, the carbonating device includes a carbonating pressure regulator, a discharge port pressure regulator, and a trigger pressure regulator. The carbonating pressure regulator causes the valve 540 to close the exit port 530 when a pre-determined pressure is reached within the vessel. When the valve 540 closes the exit port, gas released from the gas source 200 cannot egress from the carbonating device 300. Thus further release of gas causes a pressure increase within the carbonating device. Here, the discharge port pressure regulator is arranged to cause the valve 430 in the discharge port 420 to close the discharge port when a pre-determined pressure is reached within the discharge device 300. Further gas release from the gas source 200 causes a further pressure rise within the discharge assembly 300 as gas released from the gas source 200 cannot egress from the discharge assembly 400. Here, the trigger pressure regulator prevents activation of the trigger 410 from opening the valve 404.

Consequently, there is provided a carbonating device that connects to a compressed gas source and provides means to prevent the over pressurisation of the vessel, or carbonating device, without venting high pressure compressed gas to the atmosphere. This improves the safety aspects of the carbonating device. Also the trigger pressure regulator acts as a flow rate reducer to the gas source. Thus, the risk of icing is reduced. Furthermore, once the carbonating device has been used to carbonate one vessel, the discharge assembly can be removed from the cap assembly and used with a second cap assembly to carbonate a further vessel. Moreover, the discharge assembly is further improved as release of gas is prevented unless the discharge assembly is connected to the cap assembly. Thus the chances of accidental release is reduced.

Figure 4:
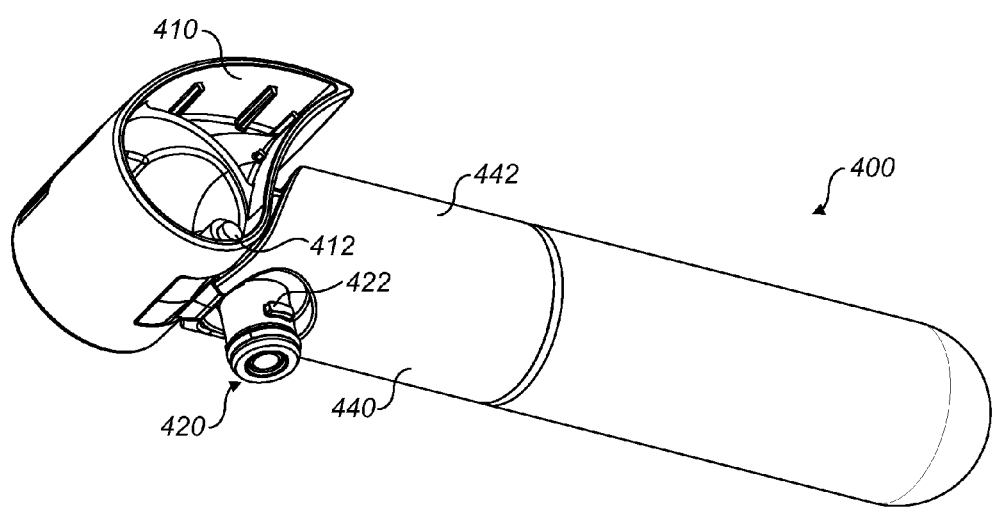
FIG. 4 is a pictorial view of the compressed gas canister and discharge assembly shown in FIG. 1.
Figure 10:
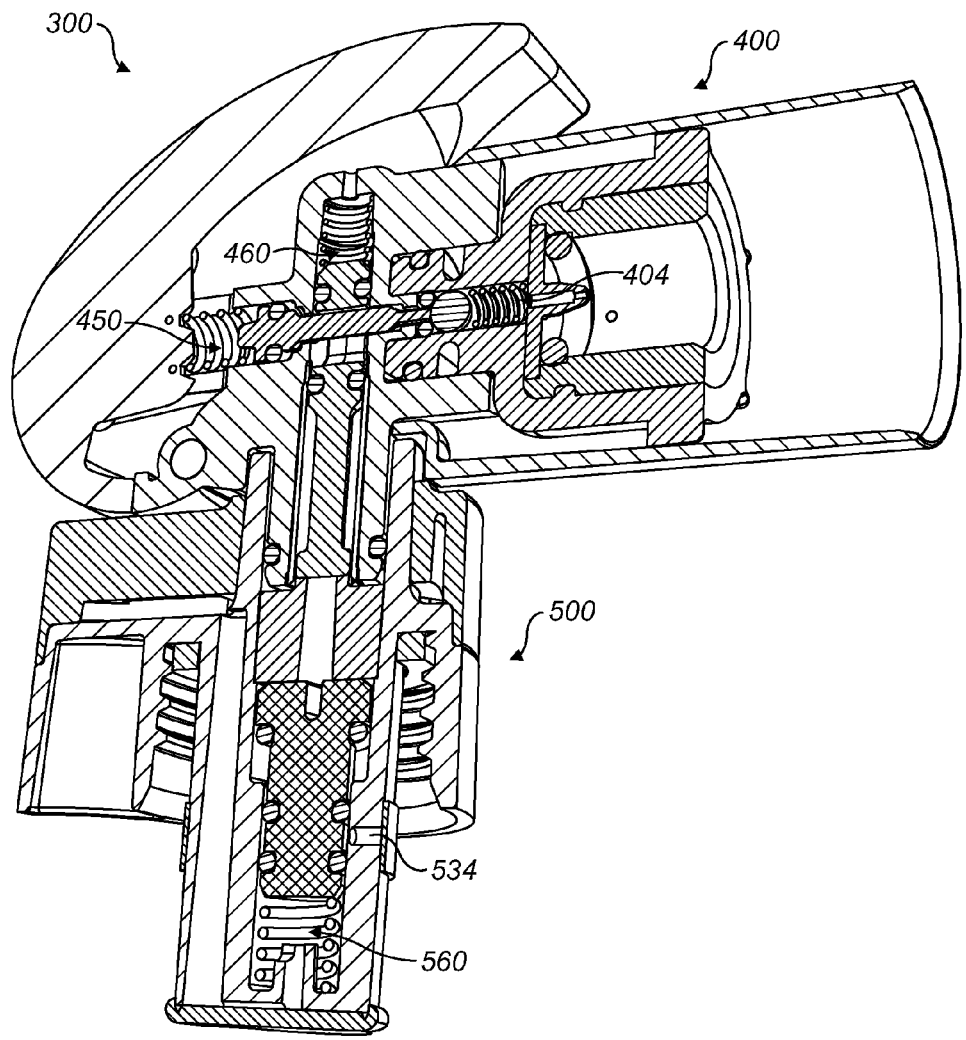
FIG. 10 shows a cross-sectional view through the carbonating device as shown in FIG. 1.

The gas source 200 is shown in FIGS. 1 and 4 as being substantially cigar shaped. Whilst the gas source 200 can be connected to the carbonating device 300 using any well known technique, preferably a screw connection is employed. More preferably, a tubular portion is provided having a double internal thread for receiving a double external thread. This has the advantage of reducing loss of $CO_2$ when the cartridge is punctured because it locates against its seal twice as quickly as a conventional single thread but without the loss of number of total turns of thread to hold the cartridge sealed. Advantageously the screw connection allows the gas source 200 to be positively pushed onto the discharge assembly 400 in order to open the gas source. For instance, as shown in FIG. 10, the carbonating device 300 includes a nozzle 310 that fits into an opening of the gas source 200 in order to penetrate a seal of the gas source 200. The seal fits tightly about the nozzle which is why a positive connection force is advantageous. Suitably, the gas source 200 is a cartridge of compressed $CO_2$. The $CO_2$ cartridge is typically pressured to around 700 psi. It has been found that a 47 g±1 gm canister is particularly preferable and is able to charge around ten 1 litre bottles before needing to be replenished or replaced. Advantageously, rather than accepting known gas sources, the connection can be customised to fit a manufacture's specific gas source 200. Thus safety can be improved as a level of quality can be maintained by the manufacturer. Also branding can be applied to the gas source 200 and the gas source 200 is less likely to be lost from being removed for use on other applications.

Referring to FIG. 4, here the gas source 200 connects to the discharge assembly 400. Suitably, the discharge assembly 400 includes a discharge body 440. The discharge body 440 defines a connection area 442 for the gas source 200 to connect there to. Suitably the connection area is a tubular portion having an internal thread for receiving an external thread of the gas source 200. The discharge body 440 defines the inlet 402 and discharge port 420. The discharge port 420 is shown as a tubular portion extending at 90 degrees to the axis of the gas source 200. It is preferable for a hole to be provided just prior to a seal between the cartridge and discharge assembly 400. This is another safety device which helps prevent the unwitting removal of a full cartridge. This is because as soon as the cartridge is loosened, the sound of discharging gas would alert the consumer that there was still gas present. The discharge body 440 provides a housing for the valve 404, valve 430, discharge port pressure regulator, and trigger pressure regulator.

Preferably the discharge port 420 connects to the entrance port 520. Whilst any known connection technique can be employed, the connection is shown as comprising a bayonet fixing. Suitably the discharge port 420 includes a protrusion 422 and the entrance port includes a corresponding aperture 522. It will be appreciated that the two parts can therefore be coupled by inserting the discharge port 420 into the entrance port 520 and subsequently twisting the discharge assembly, relative to the cap assembly, so that the protrusion and aperture engage. Preferably the protrusion and aperture engage in a cam motion so as to clamp the two parts together. Here the valve 430 is not opened until the cam action begins in order to prevent unintentional decoupling. An annular seal 424 is provided about the discharge port 420 in order to seal with the entrance port 520.

Figure 2:
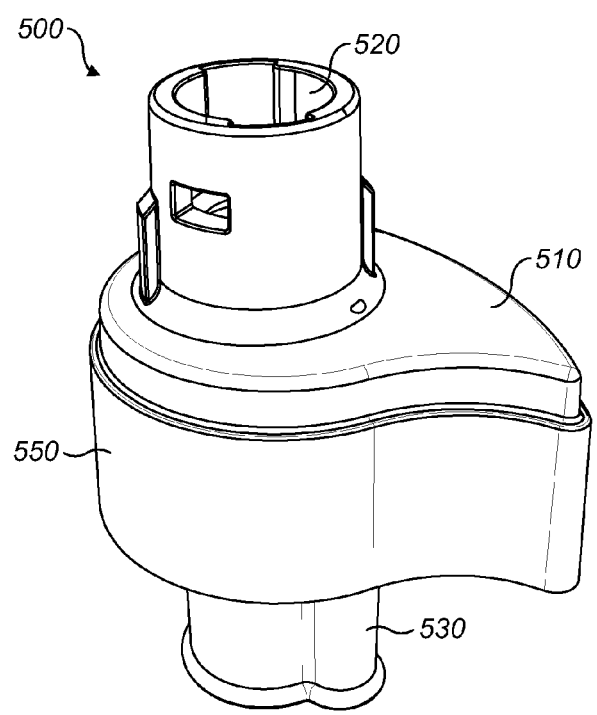
FIG. 2 is a pictorial view of the cap assembly shown in FIG. 1.
Figure 3:
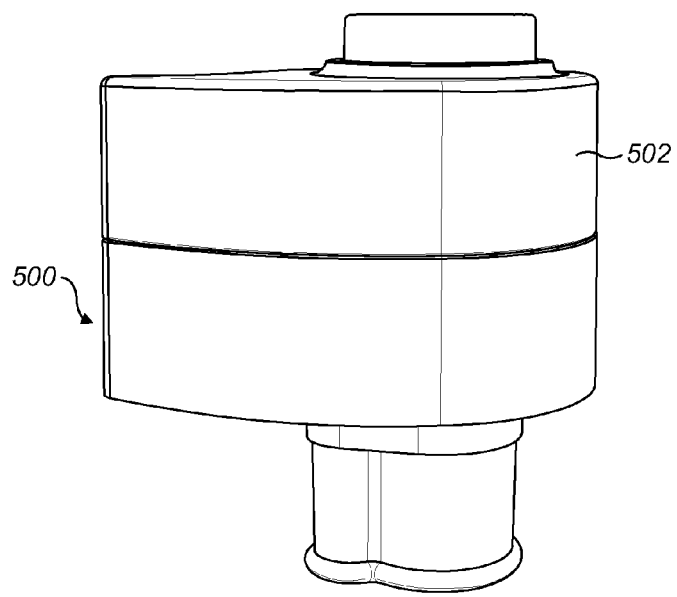
FIG. 3 is a pictorial view of the cap assembly of FIGS. 1 and 2 shown with a protective cover.

As shown in FIG. 2, the entrance port 520, sealing portion 510, and exit port 530 are formed from a cap body 550. Thus the cap body 550 provides a housing for the valve 540 and carbonating pressure regulator. The entrance port 520 is shown as a tubular section extending away from one side of the sealing portion. The sealing portion 520 seals with the vessel. For instance the sealing portion includes an internal thread for tightening on the external thread of a vessel. The exit port 530 is shown as extending from the other side of the sealing portion. Thus the exit port enters the vessel. As shown in FIG. 3, although not necessary, when the discharge assembly 400 is not attached to the cap assembly, a cover 502 can be used to protect the entrance port 520.

Figure 5:
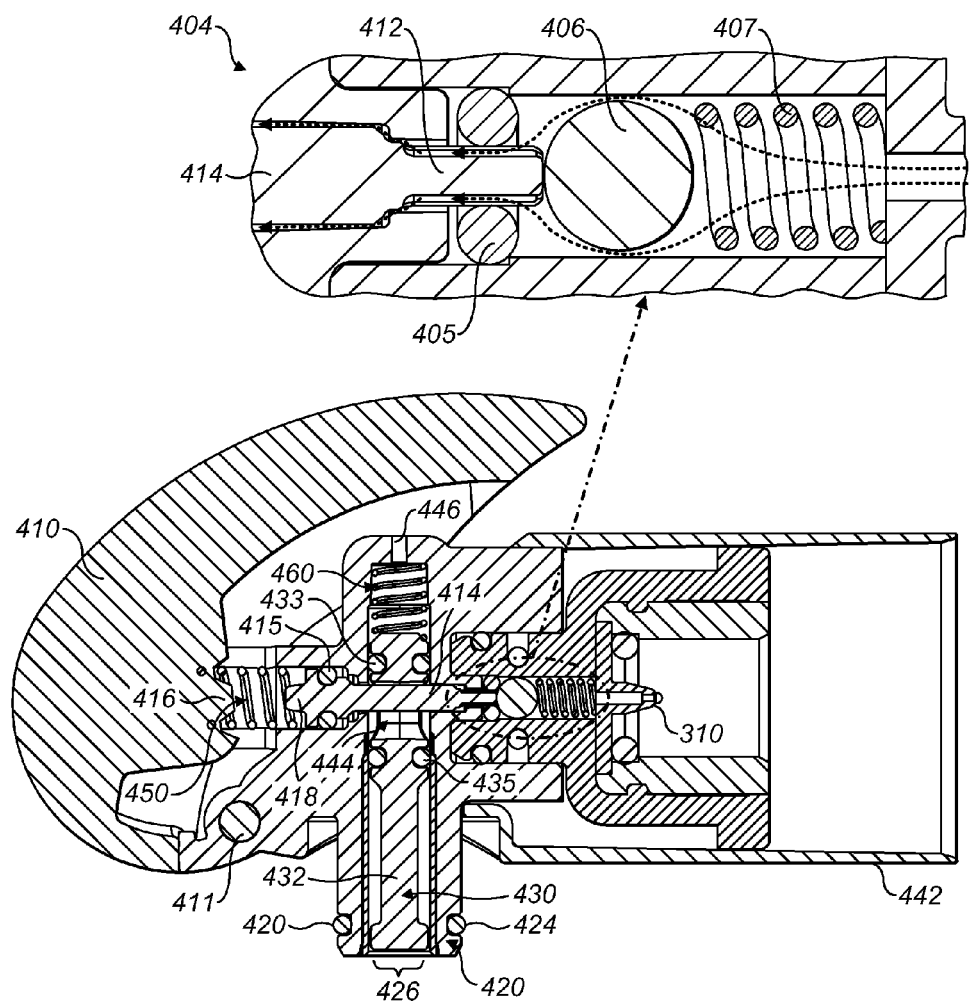
FIG. 5 is a cross-sectional view through the discharge assembly as shown in FIG. 1.

Referring to FIG. 5, the valve 404, valve 430, discharge port pressure regulator, and trigger pressure regulator are explained in more detail. When a gas source 200 is connected, nozzle 310 penetrates or punctures a seal of the canister in order to allow gas to escape from the gas source 200, through the nozzle 310 to the inlet 402. The inlet 402 is shown as a substantially tubular bore extending coaxially with an axis of the gas source 200 and nozzle 310. The valve 404 is located within the tubular bore. Suitably the valve 404 is shown as comprising a sealing aperture 405, closure member 406 and biasing means 407. The sealing aperture is shown as suitably comprising an annular seal seated within the tubular bore to seal thereto. The closure member 406 is suitable for closing the sealing aperture 406 whilst being sized so that gas can pass between the tubular bore and closure member. Here the closure member comprises a ball bearing 406 that is freely mounted within the tubular bore. The biasing means 407 is shown as suitably comprising a resilient member such as a compression spring. The biasing means 407 abuts a stop at an end of the tubular bore which receives the gas from the nozzle 310. For instance, a stop is formed by an annular ledge at the connection between the tubular bore and nozzle. Thus the biasing means acts to urge the ball bearing 406 against the annular seal 405. When the ball bearing presses against the annular seal, the inlet 402 is closed. It will be appreciated that gas pressure within the gas source assists the biasing of the ball bearing against the annular seal.

The trigger 410 opens the inlet 402 by causing the closure member to become unseated from the sealing aperture. Referring to FIG. 5, suitably an abutment member 412 unseats the closure member by pushing the closure member against the biasing action of the biasing means. The abutment member 412 is sized so as not to seal against the sealing aperture. For instance the abutment member may be fluted. This is advantageous as it means the abutment member is supported by the sealing aperture. Thus, once the closure member has been unseated, gas is released from the inlet aperture through the sealing aperture and along the sides or flutes of the abutment member 412 into a sealed first chamber 444. It will be appreciated that the rate of flow from the inlet 402 will be determined by the distance that the ball bearing is unseated by. Suitably, as shown in the figures, the abutment member 412 is connected to a trigger piston 414. The trigger piston 414 is able to slide in a sealable arrangement within a bore of the discharge body 440 that extends away from the first chamber 444. Here an annular sealing ring 415 is provided. The annular sealing ring 415 prevents gas from escaping the first chamber 444. An end of the bore that the piston seals within and opposed to the end in fluid communication with the first chamber 444 is vented to the environment.

It will be appreciated therefore that the trigger 410 is suitable for causing the abutment member 412 to unseat the closure member. Here, the trigger is shown as being suitable for causing the trigger piston to slide relative to the bore. A suitable trigger mechanism is shown in FIGS. 4 and 5. Here, preferably, the trigger 410 is pivotally connected at pivot 411 to the discharge body 440. Consequently, rocking the trigger 410 about the pivot 411 causes a portion 416 of the trigger to pivot. Thus portion 416 is advanced toward a distal end 418 of the trigger piston 416. As will be described herein, when the pressure within the first chamber 444 is below a predetermined maximum, the movement of portion 416 causes the trigger piston to slide toward the closure member 406. Consequently, the abutment member 412 unseats the closure member and releases gas from the gas source 200. When the trigger 410 is released, the biasing means 407 biases the trigger piston to slide backward, thus biasing the trigger 410 to rock back again and thereby closing the inlet 402.

The trigger 410 and closure member are connected via the trigger pressure regulator. Suitably the trigger pressure regulator comprises a resilient member 450. Here, the resilient member is shown as connecting the portion 416 of the trigger to the distal end 418 of the trigger piston. The resilient member 450 is arranged to compress at a predetermined compression force (herein the high-pressure value). Thus, when the pressure within the first chamber 444 is less than the predetermined high-pressure value, the resilient member 450 transfers the movement of the portion 416 to the trigger piston to open the inlet. However, when the pressure within the first chamber 444 increases above the high-pressure value, rather than move the trigger piston, the resilient member 450 compresses. Thus an automatic cut-off is provided that prevents gas from over pressurising the first chamber 444. Suitably the resilient member 450 is a compression spring. Here the compression spring abuts the portion 416 and distal end 418 of the trigger piston.

Figure 6:
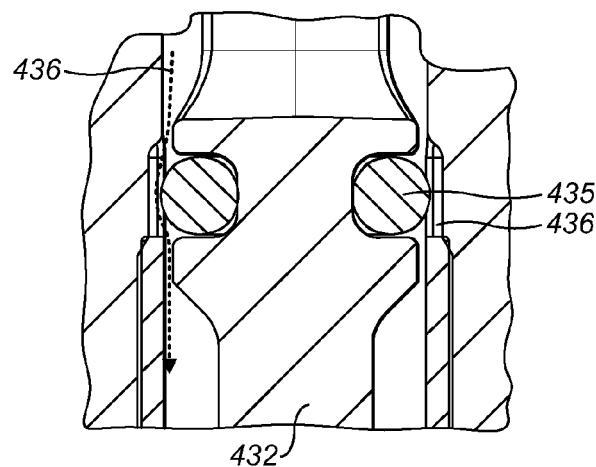
FIG. 6 is an enlarged view of a portion of FIG. 5 shown in an open orientation.

The discharge port 420 includes a discharge aperture 426. The discharge aperture is in fluid communication with the first chamber 444. Here, the discharge aperture is connected to the chamber 444 via a bore. Suitably the bore is coincident with the discharge port and extends at ninety degrees to the trigger piston. The bore extends to a shelf formed in the chamber body 440. An aperture 446 vents the bore to the environment. The bore is in fluid communication with the chamber and the valve 430 is arranged within the bore in order to seal the bore either side of the fluid communication between the bore and chamber. Suitably, as shown in FIG. 5, a discharge piston 432 is arranged within the bore. Here an annular seal 433 is seated in the piston and provided to seal the piston 432 to the bore to one side of the fluid communication with the chamber 444. It will be appreciated that annular seal 433 therefore maintains the sealed chamber 444. A second annular seal 435 is seated in the piston and arranged to selectively seal within the bore that extends from the other side of the fluid communication with the chamber 444. Seal 435 seals the chamber 444 when the valve is in the closed position but allows fluid to egress the discharge aperture when the valve is opened. It will be appreciated that the valve is opened by movement of the piston within the bore. Further movement in the same direction closes the valve again. Suitably, the bore is provided with a recess 436 (FIG. 6) formed partway down the bore. Thus the bore has an area of increased diameter surrounded by annular areas of reduced diameter. One method of forming the recess is by forming a stepped bore that extends from the discharge aperture and then inserting a sleeve so that an end of the sleeve is off-set from the step in the bore. Thus an annular recess is formed. This forms a step in the bore that may apply additional friction to the seals as they slide thereover. Thus it is preferable to form the recess via one or more flutes. Here the flutes form elongate cavities formed axially along the circumferential face of the bore. Thus the seal 435 is supported whilst adjacent the flutes but fluid passage is allowed. The valve is closed by arranging seal 435 to seal against either of the reduced diameter areas. Whereas, when the seal 435 is arranged adjacent to the increased diameter area, the valve is open as gas may pass between the seal 435 and bore (as shown by arrows 436 in FIG. 6).

The valve 430 is biased to close the discharge aperture and therefore seal the first chamber 444 by the discharge port pressure regulator. Suitably the discharge port pressure regulator is shown as resilient member 460. The resilient member 460 acts between a distal end of the discharge piston 432 and the discharge body. As shown, the resilient member 460 is arranged to bias the seal 435 towards the discharge aperture 426 and such that it seals against the reduced diameter area closest to the discharge aperture 426. Abutment prevents further downward movement. As shown, it is preferable for the abutment to be provided by the trigger position.

Thus to open the valve 430, the discharge piston 432 must be moved against the bias of the resilient member 460 so that the seal 435 is adjacent the increased diameter area. As will be explained further below, if pressure builds up within chamber 444, the discharge regulator is arranged to close valve 430. Here the resilient member is arranged to compress at a predetermined compressive force (herein the mid-pressure value). Thus when pressure within chamber 444 increases above the mid-pressure value (which is less than the top-pressure value of resilient member 450), the resilient member 460 compresses due to the force applied by the pressure acting on seal 433. Consequently, the discharge piston 432 is moved toward the reduced diameter area furthest away from the discharge aperture 426 until seal 435 seals with the reduced diameter area and closes the valve 430, resealing chamber 444. Advantageously, the valve 430 is caused to automatically close when a predetermined pressure is reached within chamber 444.

For compactness it is preferable for axes of the discharge piston and trigger piston to intersect each other. For instance, as shown in FIG. 5, here one of the pistons has a reduced diameter to the other at an area of intersection. The other piston includes an elongate slot through which the reduced area passes.

Figure 7:
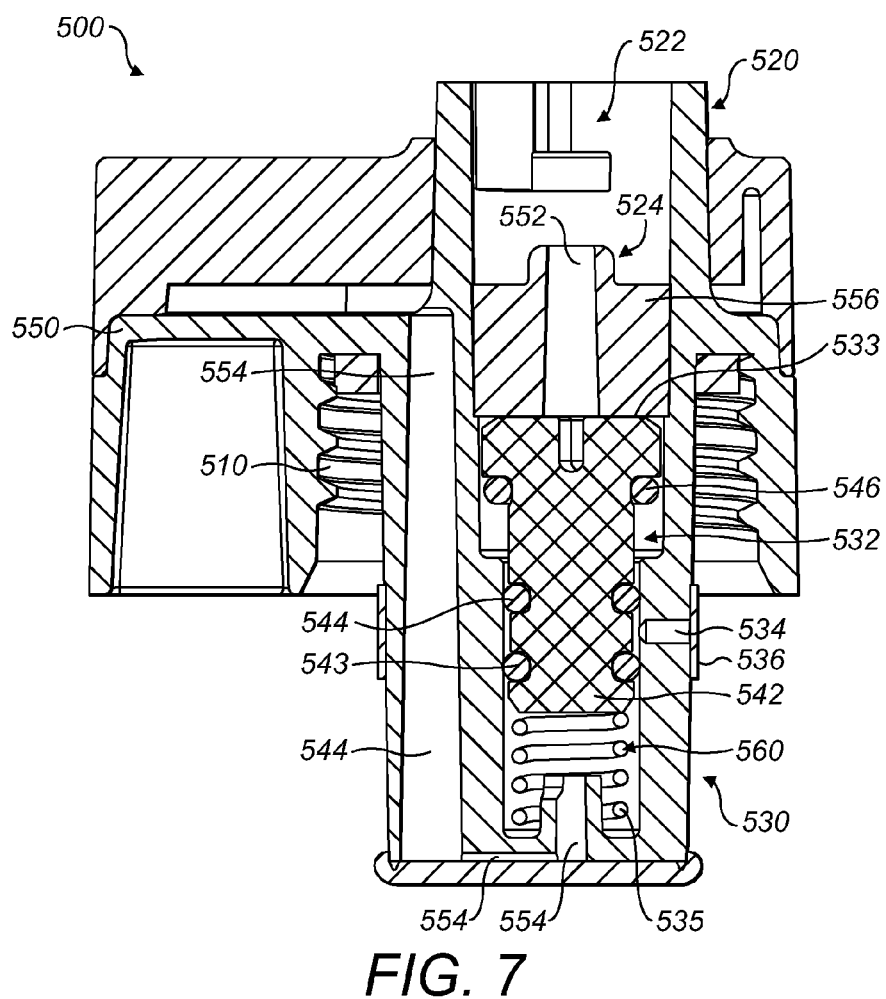
FIG. 7 is a cross-sectional view through the cap assembly as shown in FIG. 1-3.

Referring to FIG. 7, the valve 540 and the carbonating pressure regulator are described in more detail. The entrance port includes a socket 522 for receiving the discharge port of the discharge assembly 400. A distal end of the socket 522 includes an upwardly extending protrusion 524 centred on an axis of the socket. In use, when the discharge port 420 is inserted into the socket 522, the protrusion 524 abuts a distal end of the discharge piston 432. It will be appreciated that this abutment causes the discharge piston to move to the open position as described above. A passageway 552 connects the distal end of the socket 522 with a second chamber 532. The second chamber is formed in the exit port. An exit 534 vents the second chamber 532 to the inside of the vessel. The exit 534 includes a non-return valve to prevent fluid from passing from the vessel back into the second chamber 532. The non-return valve is shown as band 536. The valve 540 is arranged within the second chamber in order to open and close the exit.

The valve 540 suitably comprises a shut-off piston 542. Consequently, chamber 532 is substantially cylindrical. Here the exit 534 is formed in a cylindrical face of the chamber 532. The shut-off piston 542 is urged against one end face 533 of the chamber 532 by the carbonating pressure regulator acting between the other end face 535 of the chamber 532 and distal end of the shut-off piston 542. An end of the chamber housing the carbonating pressure regulator is vented to the atmosphere via passage 554.

Figure 8:
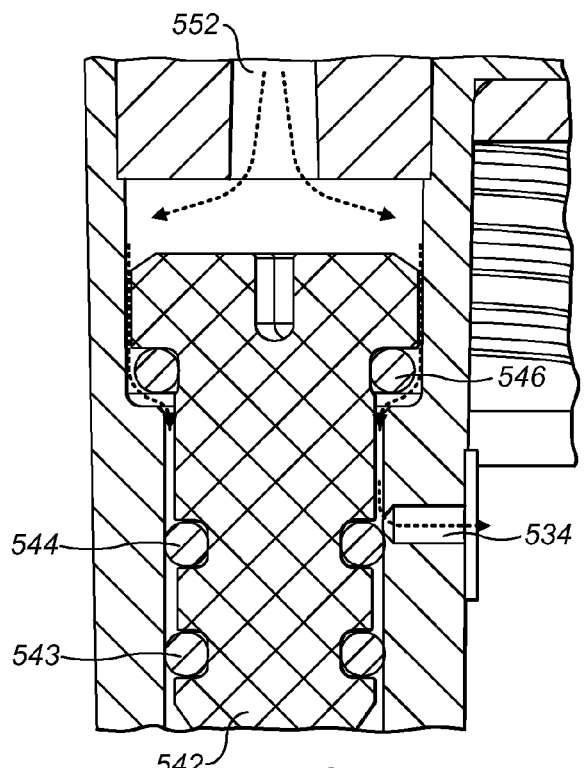
FIGS. 8 and 9 are enlarged views of a portion of FIG. 7 shown in a carbonating orientation and a shut-off orientation respectively.
Figure 9:
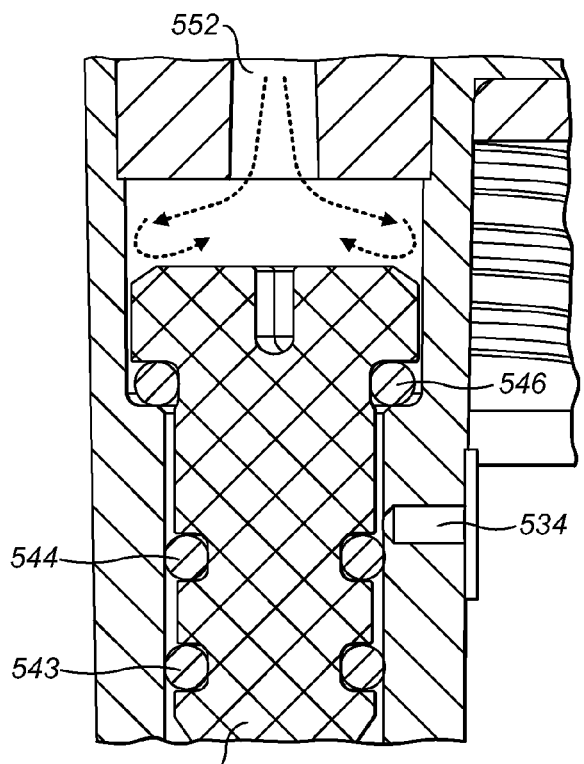

The carbonating pressure regulator is suitably shown as a resilient member 560 such as a compression spring. When the shut-off piston 542 is urged against the face 535, under the biasing force of the resilient member 560, annular sealing rings 543, 544, which are seated on the piston, are arranged either side of the exit 534. Each annular sealing ring 543, 544 seals the piston to the chamber 532. Thus the exit 534 is closed. The passageway 552 enters the chamber 542 above the annular sealing ring 544 located between the exit 534 and the face 533. Consequently, gas enters from the passageway 552 and pressurises the chamber 532. This pressure acts on the sealing ring 544 to urge the shut-off piston 542 against the biasing force of the resilient member 560. As the pressure increases, the resilient member is compressed sufficiently so that the annular seal 544 passes the exit. Thus gas is discharged into the vessel in order to carbonate an empty space of the vessel (as shown in FIG. 8). As the empty space is filled with gas, the pressure increases, which increases the pressure within the chamber 532. The resilient member is arranged to compress such that exit 534 is closed by a third seal when the pressure within the chamber 532 exceeds a pre-determined compressive force (herein the low pressure value). The third seal is shown as an annular sealing ring 246 seated under a piston head of the shut-off piston. The piston head is arranged in an area of increased diameter such that gas can flow around the head and between the head and walls of the chamber. Pressure from the gas acting on the piston head urges the sealing ring 246 to seat against a ledge in the chamber 532 as shown in FIG. 9 thereby shutting off the exit 534.

To improve manufacturability, the socket, passageway 552 and shut-off piston 542 are all co-axial. Here the passageway 552 can be formed in a push-fit part 556 that is secured fast to and part way down a bore such that the bore on one side of the push-fit part 556 forms the socket and the bore on the other side of the push-fit part forms the chamber 532.

Referring to FIG. 10, the cap is sealed to a vessel to be carbonated using the sealing portion 510. The discharge assembly (including the gas source 200) is then attached. Attachment of the discharge assembly to the cap assembly causes the protrusion 524 to abut the discharge piston 432 and move the valve 430 to the open position. Depressing the trigger 410 causes gas to be released from the gas source into the first chamber. If the flow rate into the chamber maintains the pressure within the first chamber below the mid pressure valve, the inlet 402 remains open and the gas is vented through the discharge aperture 426 and into the second chamber. When sufficient pressure is built up, the annular seal 544 moves past the exit 534. If the pressure is beneath the low pressure valve, the shut-off valve does not move to the second closed position and therefore the outlet remains open. The vessel is therefore carbonated by continuing to depress the trigger. When the predetermined pressure in the vessel is reached, the shut-off piston is urged by the pressure to compress the carbonating pressure regulator sufficiently such that the third seal 546 closes the exit 534. If the trigger is not released, pressure continues to build within the carbonating device 300. When the pressure exceeds the mid-pressure value, the discharge pressure regulator compresses and shuts off the valve 430 so that gas is not discharged into the cap assembly. If the trigger is still held depressed, the pressure within the first chamber builds, before exceeding the top-pressure value, which closes the inlet 402 so that the gas source 200 is re-sealed.

When the discharge assembly is decoupled from the cap assembly, the pressure is relieved from acting on the head of the shut-off piston. Consequently the resilient member 560 urges the shut-off piston back towards the end face, wherein seals 543 and 544 close the exit sealing the gas within the vessel. The cap remains in place until access to the vessel is required again. Decoupling of the cap assembly and discharge assembly also relieves the pressure acting on seal 435. Thus the discharge pressure regulator urges the discharge piston 432 toward the discharge aperture 426 shutting the discharge aperture to prevent accidental discharge of the gas.

Consequently, there is provided a three stage pressure reduction system where the source of gas is shut off after a predetermined pressure is reached at each stage. The first stage shuts off the flow of gas above a predetermined pressure. Thus it limits the maximum pressure of discharging gases and limits the flow rate. The maximum pressure limitation is first and foremost a safety device that forms part of an overall safety system that combined with the next two pressure reduction valves virtually eliminates the possibility of injury. Also, low flow rate decreases the likelihood of icing and allows for a free flowing stream of gas. The next stage also performs two functions. Firstly it eliminates discharge of gas if the discharge assembly is not attached to the cap assembly. Secondly, it limits the maximum pressure and flow rate delivered. Likewise the third stage prevents over pressurisation of the vessel and limits the pressure and flow rate of the gas expelled from the exit.

The low, medium and high-pressure values can be set according to the application. It has been found that a low-pressure value of around 30 psi is sufficient for keeping a vessel of carbonated drink fresh when some of the drink has been removed. If the carbonated drink has been allowed to go flat, it has been found that a low-pressure value of around 50 psi is sufficient to recharge, or re-carbonate the drink. The medium and high-pressure values are set accordingly. Sufficient steps between the values should be left so that the pressure regulators trip in turn. Thus, so that the discharge assembly can be used for both applications, a mid-pressure value of around 80 psi and a high-pressure value of around 100 psi has been found particularly suitable. Tests have shown that using these valves the device limits the maximum pressure and flow rate discharged from the gas source (pressurised to around 700 psi) to around 7.5 bar±0.35 and 15 litres per minute respectively.

Whilst the carbonating apparatus has been described in relation to a carbonating device formed from two parts, it is possible for the two parts to be formed integrally. Here, it will be appreciated that although advantageous the discharge pressure regulator, valve 430 and discharge piston, are not essential.

Although a few preferred embodiments have been shown and described, it will be appreciated by those skilled in the art that various changes and modifications might be made without departing from the scope of the invention, as defined in the appended claims.

The invention claimed is:

1. A carbonating device for carbonating an opened vessel, the carbonating device comprising:
   an inlet for receiving pressurised gas, the inlet being opened and closed by an operable inlet valve;
   an exit for expelling gas from the carbonating device into a vessel to be carbonated, the exit being opened and closed by an exit valve; and
   a trigger mechanism for opening the operable inlet valve in order to allow gas egress through the inlet; wherein
   a trigger pressure regulator is arranged to automatically close the operable inlet valve when a predetermined first pressure value is exceeded within the carbonating device and a carbonating pressure regulator is arranged to automatically close the exit valve when a predetermine second pressure value is exceed within the carbonating device, wherein the first pressure valve is higher than the second;
   wherein the carbonating device comprises a discharge assembly and a cap assembly, the discharge assembly being able to be coupled and de-coupled from the cap assembly wherein the discharge assembly includes the inlet, inlet valve, trigger, and trigger pressure regulator and the cap assembly is suitable for sealing to a vessel to be carbonated and includes the exit; and
   wherein the discharge assembly further includes a discharge port for discharging gas to the cap assembly, the discharge port being opened and closed by a discharge valve and a discharge pressure regulator is arranged to automatically close the discharge valve when a predetermined third pressure value is reached within the discharge assembly, the third pressure valve being between the first pressure valve and the second pressure valve.

2. The carbonating device of claim 1, wherein the exit valve comprises a carbonating piston that is specifically adapted so that gas pressure within the carbonating assembly urges the carbonating piston to move initially in a first direction to an open position where, when pressure within the carbonating assembly exceeds the predetermined third pressure value, the carbonating piston moves further in the first direction to a closed position.

3. The carbonating device as claimed in claim 1, wherein the operable inlet valve comprises a closing member and the inlet is opened by causing the closing member to move away from the inlet, wherein the trigger mechanism is operable to cause the closing member to move and the trigger pressure regulator couples the trigger mechanism to the closing member.

4. The carbonating device as claimed in claim 3, wherein the closing member is biased to move toward the closed position.

5. The carbonating device as claimed in claim 1, wherein the trigger mechanism is coupled to a trigger piston via the trigger pressure regulator, the inlet valve being opened and closed dependant on a position of the trigger piston, wherein gas pressure within the carbonating device acts on the trigger piston to urge the trigger piston to move toward a position in which the inlet valve is closed.

6. The carbonating device as claimed in claim 1, wherein the exit valve comprises a carbonating piston and gas pressure within the carbonating assembly urges the carbonating piston to close the exit, wherein the carbonating pressure regulator controls the movement of the piston.

7. The carbonating device as claimed in claim 2, wherein the discharge valve comprises a discharge piston, the discharge piston being biased to a position in which the discharge port is closed, wherein coupling of the discharge assembly and cap assembly causes the piston to move to a position in which the valve is open, the discharge piston being arrange so that gas pressure within the discharge assembly acts on the discharge piston to urge the discharge piston to move to a position in which the discharge valve is closed, wherein the discharge pressure regulator controls the movement of the discharge piston.

8. The carbonating device as claimed in claim 1, wherein one or more of the trigger pressure regulator, discharge pressure regulator, or carbonating pressure regulator comprise a resilient member, wherein the respective predetermined pressure value is dependant on the force required to compress the resilient member.

9. A carbonating device comprising a gas source and carbonating device, the gas source being coupled to the carbonating device, and wherein the carbonating device is as claimed in claim 1.

10. The carbonating device as claimed in claim 9, wherein the gas source is able to be de-coupled from the carbonating assembly in order to replace spent gas sources.

11. A discharge assembly for use in coupling with a cap assembly in order to form a carbonating device as claimed in claim 1, the discharge assembly comprising:
   an inlet for receiving pressurised gas, the inlet being opened and closed by an operable inlet valve;
   a trigger mechanism for opening the operable inlet valve in order to allow gas egress through the inlet;
   a trigger pressure regulator arranged to automatically close the operable inlet valve when a predetermined high pressure value is exceeded within the discharge assembly; and
   a discharge port for discharging gas to a cap assembly for expelling gas from an exit that is opened and closed by an exit valve, the discharge port being opened and closed by a discharge valve and a discharge pressure regulator is arranged to automatically close the discharge valve when a predetermined mid pressure value is reached within the discharge assembly.

12. A cap assembly for use in coupling with a discharge assembly in order to form a carbonating device as claimed in claim 1, the cap assembly comprising:
   an entrance port for receiving gas from a discharge port of a discharge assembly;
   an exit for expelling gas from the cap assembly into a vessel to be carbonated, the exit being opened and closed by an exit valve; and
   a carbonating pressure regulator that is arranged to automatically close the exit valve when a predetermine low pressure value is exceed within the cap assembly.

13. A method of carbonating a vessel, the method comprising sealing a carbonating device to the vessel, wherein the carbonating device is as claimed in claim 1, and the method comprises:
   causing the carbonating pressure regulator to automatically close the exit from the carbonating assembly when the predetermined second pressure value is exceed within the carbonating assembly;
   causing the trigger pressure regulator to automatically close the inlet to the carbonating assembly when the predetermined first pressure value is exceeded; and
   causing the discharge pressure regulator to automatically close the discharge port from the discharge assembly when the predetermine third pressure value is exceeded within the discharge assembly.

14. The method of claim 13 comprising connecting the cap assembly to the opened vessel, and attaching the cap assembly to the discharge assembly before discharging gas, wherein connecting the cap assembly to the discharge assembly causes the discharge valve to open.

* * * * *